United States Patent
Yopp

[11] 3,814,381
[45] June 4, 1974

[54] COMBINATION STEEL AND TEFLON SEAT

[75] Inventor: John Yopp, Homewood, Ill.

[73] Assignee: Union Tank Car Company, Chicago, Ill.

[22] Filed: May 25, 1973

[21] Appl. No.: 364,181

Related U.S. Application Data

[63] Continuation-in-part of Ser. No. 181,776, Sept. 20, 1971, abandoned.

[30] Foreign Application Priority Data
Aug. 1, 1972 Canada.............................. 148452

[52] U.S. Cl.................. 251/315, 251/170, 251/317
[51] Int. Cl............................. F16k 5/06, F16k 5/20
[58] Field of Search .......... 251/315, 316, 317, 159, 251/170, 180, 188, 192, 203, 362

[56] References Cited
UNITED STATES PATENTS

| | | | |
|---|---|---|---|
| 3,132,837 | 5/1964 | Britton.......................... | 251/317 X |
| 3,168,279 | 2/1965 | Anderson et al. .............. | 251/317 X |
| 3,179,121 | 4/1965 | Bredtschneider et al....... | 251/316 X |
| 3,210,042 | 10/1965 | Freeman......................... | 251/309 X |
| 3,211,421 | 10/1965 | Johnson, Jr. et al............ | 251/317 X |
| 3,273,852 | 9/1966 | Ripert............................. | 251/317 X |
| 3,370,335 | 2/1968 | Freed.............................. | 251/309 X |
| 3,588,042 | 6/1971 | Yopp.................................. | 251/315 |
| 3,682,439 | 8/1972 | Neto................................. | 251/315 |

*Primary Examiner*—Henry T. Klinksiek
*Attorney, Agent, or Firm*—Joel E. Siegel; Charles M. Kaplan

[57] ABSTRACT

An improved seat ring, having a wedge shape cross section, for use within a top entry ball valve; including: an outer ring, formed of material substantially immune to circumferential and radial expansion, having a rear inclined surface positioned to contact cooperating ring retainer sidewalls; and an inner ring, formed of a yieldable material, secured to a front surface of the outer ring and positioned to form a seal with the ball.

5 Claims, 4 Drawing Figures

PATENTED JUN 4 1974  3,814,381

3,814,381

COMBINATION STEEL AND TEFLON SEAT

BACKGROUND AND SUMMARY OF THE INVENTION

This application is a continuation-in-part to U.S. Pat. application Ser. No. 181,776, now abandoned and assigned to the same assignee as the present invention.

This invention relates to ball valves, and more particularly to an improved valve seat ring for use in a top entry ball valve.

The present invention is an improvement of the "Top Entry Ball Valve" disclosed in U.S. Pat. No. 3,588,042, which has a common inventive entity and assignee as the present invention. This patent is hereby incorporated by way of reference since certain objects, features and advantages of the present invention are common to certain objects, features and advantages of said patent.

The ball valve of the type disclosed in U.S. Pat. No. 3,588,042, utilizes a pair of seat rings, of wedge shape cross section, to fit against and clampingly secure the ball therebetween. A pair of seat ring retainer means, having side walls inclined downwardly and inwardly, wedge the ball and seat rings therebetween. A bonnet means selectively applies pressure to the upper surfaces of the seat rings, thereby compressing the seat rings to the ball and seat ring retainer means. The present invention is drawn to a seat ring construction specifically designed to increase the performance of such a valve.

It is a primary object of the present invention to provide an improved valve seat ring for use in a ball valve.

Another object is to provide a valve seat ring for use in a ball valve which resists expansion in a radial direction.

A further object is to provide a valve seat ring for use in a ball valve wherein the coeficient of friction between the rear surface of the valve seat ring and the valve seat retaining means is reduced so as to facilitate relative movement therebetween.

A still further object is to provide a valve seat ring for use in a ball valve that is both effective to permit relative movement between the rear surface of the valve seat ring and the valve seat ring and the valve seat retaining means and to prevent commodity from passing therebetween.

A further object is to provide a top entry ball valve that is inexpensive to manufacture without sacrificing quality or reliability in operation.

To attain these and other objectives, the present invention provides a body having two longitudinally aligned fluid passages and a lateral opening communicating with a central space. A rotatable ball, having an opening communicable with the fluid passages, is positioned within the central space. A pair of annular seat rings of wedge shape cross section, fit against and clampingly secure the ball therebetween. A pair of seat ring retainer means, integral with the body, having side walls inclined downwardly and inwardly, wedge the ball and seat rings therebetween. Each seat ring includes an outer ring, formed of metallic material, having a rear inclined surface positioned to contact the ring retainer side walls. An inner ring formed of a yieldable material, is received within an annular recess in the front surface of the outer ring and is positioned to form a seal with the ball. Sealing means is positioned within an annular recess in the rear surface of the outer ring to contact the ring retainer side wall and thereby cause a seal between the outer ring and the ring retainer means. Bonnet means are provided to selectively apply pressure to a reduced top surface area of the outer rings so as to compress the inner rings against the ball and the sealing means against the ring retainer means. A rotatable valve stem passes through the lateral opening and the bonnet means, and is connected to the ball to rotate the ball between positions of permitting and preventing the passage of fluid therethrough.

DESCRIPTION OF THE DRAWINGS

With these and other objects in view, as will hereinafter more fully appear, and which will be more particularly pointed out in the appended claims, reference is now made to the following description taken in connection with the accompanying drawings, in which:

DESCRIPTION OF A PREFERRED EMBODIMENT

Figure 1:
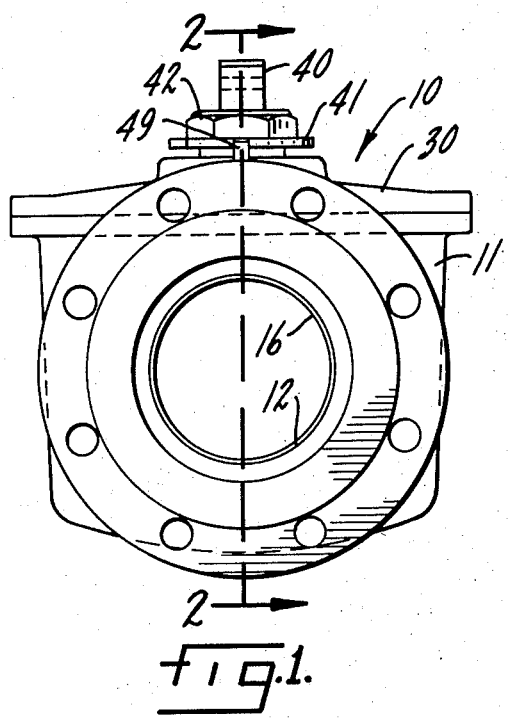
FIG. 1 is an elevational view of a valve of the type contemplated for use with the improved valve seat ring of the present invention.
Figure 2:
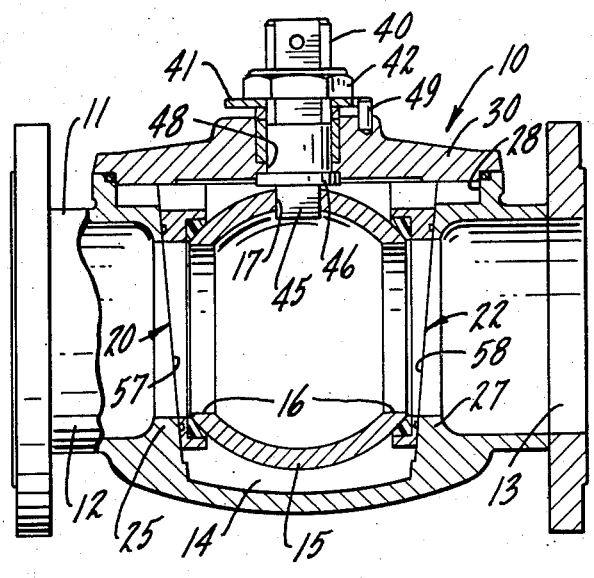
FIG. 2 is a sectional view taken along line 2—2 of FIG. 1.

Referring to FIGS. 1 and 2, the ball valve 10 has a tubular body 11 formed with an inlet passate 12 and an outlet passage 13 extending in axial alignment, one with the other. Body 11 is preferably pressure formed from one piece of tubular material to the shape as illustrated. Interposed between these passages is central space 14 containing ball valve member 15. A flow passage 16 is formed in ball 15 to establish fluid flow between inlet passage 12 and outlet passage 13, when the valve is in an open position, as in FIG. 2. At opposite sides from passage 16, ball 15 has a barrier wall portion of spherical form which prevents fluid flow between passages 12 and 13 when the valve is in the closed position.

Ball 15 is mounted between two wedge shape seat rings 20 and 22, both of which are in turn supported by a pair of seat ring retaining means 25 and 27. As can be seen in FIG. 2, seat ring retaining means 25 and 27 are formed integral with body 11 and are in fluid communication with passages 12 and 13 respectively. Retaining means 25 and 27 have side walls 57 and 58 respectively, inclined downwardly and inwardly approximately 5° from the vertical. Ball 15 and seat rings 20 and 22 are wedged between retaining means 25 and 27.

Body 11 has a lateral opening 28, through what may be considered the top of the body, through which ball valve member 15 and its associated seat rings 20 and 22 may be removed. Closing off opening 28 is a bonnet 30 which may be removably secured to the valve body in any conventional manner, i.e. by a series of cap screws (not shown). A stem 40, to which is suitably secured stop plate 41 by way of a lock nut 42, has at its lower end a downwardly projecting lug 45 adapted to engage a shallow slot 17 in the top of ball 15. This stem and the interconnecting lug and slot constitute means for rotating ball 15 about a vertical axis. Stem 40 has an annular flange 46 at its lower end which is shaped to provide the lug 45. The upper portion of stem 40 passes through a suitable cylindrical hole 48 in bonnet 30 having a diameter less than the diameter of flange 46. Thus, by removal of bonnet 30, access may be had to ball 15 and seat rings 20 and 22. Bonnet 30 may be provided with an upwardly extending follower 49 which is received by a quater circle notch in the outer surface of stop plate 41, so as to limit rotation of stem 40 to 90°.

The present invention is directed primarily to the construction of seat rings 20 and 22 and their structural relationship to seat ring retaining means 25 and 27. Since the two seat rings 20 and 22 are structurally identical in the valve illustrated, the description will be directed to the construction and action of seat ring 20.

Figure 3:
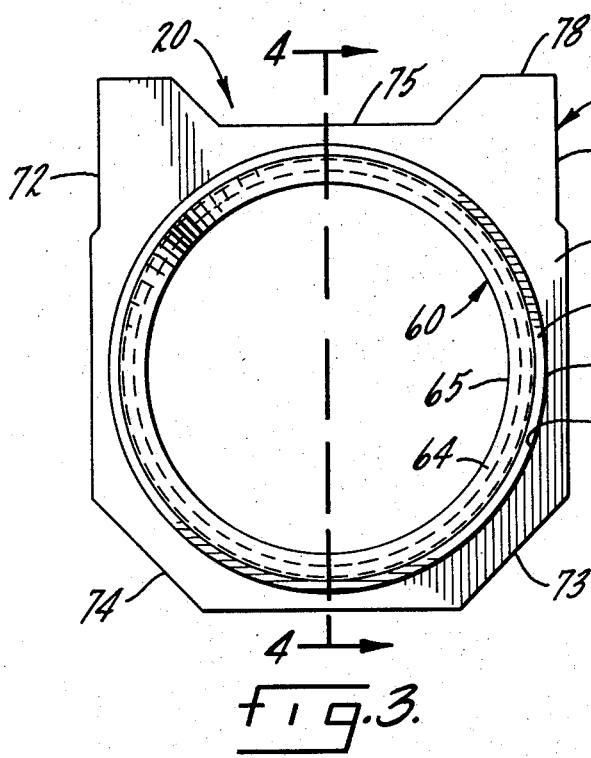
FIG. 3 is an elevational view of the improved valve seat ring of the present invention.
Figure 4:
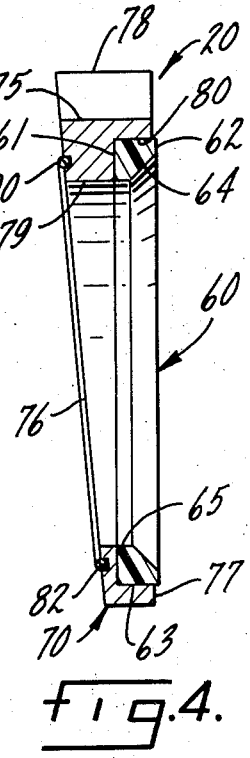
FIG. 4 is a sectional view taken along line 4—4 of FIG. 3.

Seat ring 20 includes an inner sealing ring 60 confined within an outer ring 70, as best seen in FIGS. 3 and 4. The outer ring 70 is substantially rectangular in side elevation, as seen in FIG. 3, and includes sections 71, 72, 73, 74 and 75 cut therefrom. Removal of sections 71, 72 and 75 are effective to reduce the surface area of the top surface 78 which contacts bonnet 30 to more closely approach point contacts at the outer ends. As seen in FIG. 4, outer ring 70 is wedge shape in section and includes a rear surface 76, a front surface 77 and a top surface 78. Rear surface 76 is inclined downward and inward approximately 5° from the vertical and front surface 77 is substantially vertical. An aperture 79, in axial alignment with inlet passage 12 and of substantially the same diameter of flow passage 16, is provided through ring 70 to permit fluid flow therethrough. An annular recess 80, formed out of front surface 77 to receive inner sealing ring 60, has an outer diameter greater than the diameter of aperture 79. A second annular recess 82, formed out of rear surface 76 to receive a sealing O-ring 90, has a diameter greater than the diameter of aperture 79 and less than the diameter of recess 80. Since recess 82 is formed out of surface 76 it is likewise inclined downward and inward approximately 5°. Outer ring 70 is formed preferably of metal immune in this environment to circumferentail and radial expansion, i.e., cast stainless steel.

Sealing ring 60 is integrally formed in one piece from a tough yieldable polymeric material; i.e., polytetrafluoraethylene, sold commercially under the registered trademark "TEFLON." Ring 60 includes a rear surface 61, a front surface 62 and an outer surface 63, as seen best in FIG. 4. Rear surface 61 and outer surface 63 are closely encircled and axially embraced by the side walls of recess 80. The thickness of ring 60 is slightly greater than the depth of recess 80 to ensure that ball 15 does not contact ring 70 upon wearing of seat ring 60. Front surface 62 is conically bevelled at 64 so as to engage the adjacent spherical surface of ball 15 and form a tight seal therebetween. Ring 60 includes an aperture 65 in axial alignment with aperture 79 and of substantially the same diameter.

Sealing means such as an O-ring or gasket 90 is positioned within recess 82. The diameter of O-ring 90 is slightly greater than the depth of recess 82 so as to permit the outer surface thereof to contact side wall 57 and form a fluid tight seal therewith. Forming recess 82 in rear surface 76 of ring 70, as compared to side wall 57 of retaining means 25, facilitates the formation of the recess and further reduces the effects of corrosion of the recess since the ring 70 may be made from a more erosion resistant material than the body 11 without materially increasing the cost of the valve. For example, the outer ring 70 may be formed from 316 stainless steel and the body formed from A-216-WCB carbon steel. Further, it is significantly less expensive to replace the ring 70 than to replace the body 11. Seat ring 22 is identical to seat ring 20 and is positioned with respect to seat ring retainer 27 in a similar manner.

Bonnet 30 is secured to body 11 above seat rings 20 and 22 by a vertically adjustable means, such as by a series of cap screws (not shown). A mechanical force is applied to the upper flat edges of outer surfaces 78 of outer rings 70 upon tightening of the screws, thereby evenly distributing the pressure and controlling the compression of the inner sealing rings 60 to ball 15 at 64 and rear surfaces 76 to side walls 57 and 58 respectively via O-rings 90.

The valve seat rings 20 and 22 are substantially free to slide in a generally vertical direction relative to seat ring retaining means 25 and 27 and wedge ball 15 therebetween because of a low coeficient of friction between rear surfaces 76 and side walls 57 and 58. The seal between rear surfaces 76 and side walls 57 and 58 is effected by O-ring 90 which has a relatively small contact area with side walls 57 and 58. Further, sealing rings 60 are supported within recess 80 in a manner which resists expansion in a radial direction and thereby results in a more reliable seal between ball 15 and rings 60.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In combination with a ball valve including a body having two longitudinally aligned fluid passages and a lateral opening communicating with a central space; a rotatable ball, positioned within said central space, having an opening therethrough communicable with said fluid passages; seat rings, of wedge shape cross section, positioned against and clampingly securing said ball therebetween; seat ring retainer means having flow openings aligned with said fluid passages, said seat ring retainer means further having side walls inclined downwardly and inwardly towards each other, said ball and said seat rings being wedgeably received between said side walls; bonnet means releasably secured to said body so as to selectively apply pressure to an upper portion of said seat rings and thereby compress said seat rings to said ball and seat ring retainer means side walls; and a rotatable valve stem, projecting through said lateral opening and said bonnet means, connected to said ball to rotate the ball between positions of permitting and preventing the passage of fluid therethrough; an improved seat ring comprising:

a. an outer ring, formed from a metallic material substantially immune to circumferential and radial expansion, having a rear inclined surface positioned to contact said seat ring retainer means side walls;

b. said rear surface of said outer ring having an annular recess formed therein for receipt of an O-ring for causing a seal between said outer ring and said seat ring retainer means side walls;

c. an inner ring, formed of a yieldable polymeric material, received in an annular recess in a front surface of said outer ring and positioned to form a seal with said ball;

d. said later recess having an outer diameter less than the outer dimension of said outer ring and said inner ring having a thickness slightly greater than the depth of said recess; and e. said outer ring having a section removed from an upper portion thereof extending across the entire thickness of said outer ring so as to define a top surface of reduced area to more evenly distribute the pressure applied thereto by the bonnet means and thereby control the compression of said seat rings to said ball and seat ring retainer means side wall.

2. The invention as defined in claim 1 wherein said section is removed from a central portion of said upper portion.

3. The invention as defined in claim 2 wherein sections are additionally removed from the ends of said upper portion to further reduce the surface area of said top surface.

4. The invention as defined in claim 3 wherein said outer rings are formed from a more corrosive resistant material than said body.

5. The invention as defined in claim 4 wherein said outer rings are formed from stainless steel and said body is formed from carbon steel.

* * * * *